(12) United States Patent
Al-Garni et al.

(10) Patent No.: US 11,719,851 B2
(45) Date of Patent: Aug. 8, 2023

(54) METHOD AND SYSTEM FOR PREDICTING FORMATION TOP DEPTHS

(71) Applicant: SAUDI ARABIAN OIL COMPANY, Dhahran (SA)

(72) Inventors: Marei Saeed Al-Garni, Dhahran (SA); Mohammed Sabri Al Madani, Dhahran (SA); Maan Abdullah AlHawi, Ad Dammam (SA); Mohammed AlRashed, Al Khubar (SA); Abdulrahman Albar, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 399 days.

(21) Appl. No.: 17/010,325

(22) Filed: Sep. 2, 2020

(65) Prior Publication Data

US 2022/0066064 A1     Mar. 3, 2022

(51) Int. Cl.
*E21B 49/00* (2006.01)
*G01V 1/40* (2006.01)
(Continued)

(52) U.S. Cl.
CPC ........... *G01V 5/06* (2013.01); *E21B 49/00* (2013.01); *G01V 1/28* (2013.01); *G01V 1/40* (2013.01);
(Continued)

(58) Field of Classification Search
CPC .......... G01V 5/06; G01V 5/04; G01V 99/005; G01V 1/282; G01V 11/00; G01V 1/306;
(Continued)

(56) References Cited

U.S. PATENT DOCUMENTS

2007/0294034 A1 * 12/2007 Bratton ................ E21B 43/00
                                                                        702/6
2008/0319675 A1 * 12/2008 Sayers .................. G01V 1/50
                                                                        702/11
(Continued)

FOREIGN PATENT DOCUMENTS

CN           110118994 A      8/2019
EP           3047096 A1       7/2016
(Continued)

OTHER PUBLICATIONS

Godwin, Jeff et al., "Constrained automatic tops picking using convolutional neural networks", SEG Technical Program Expanded Abstracts, Society of Exploration Geophysicists, Aug. 2019, pp. 2468-2472 (5 pages).

(Continued)

*Primary Examiner* — Jeffrey P Aiello
(74) *Attorney, Agent, or Firm* — Osha Bergman Watanabe & Burton LLP

(57) ABSTRACT

A method may include obtaining, by a computer processor, seismic data regarding a geological region of interest. The method may further include obtaining, by the computer processor, well log data from a wellbore within the geological region of interest. The method may further include determining, by the computer processor, a formation top depth using the seismic data, the well log data, a stratigraphic column, and a machine-learning model. The stratigraphic column may describe an order of various formations within the geological region of interest. The machine-learning model may assign a feature among the seismic data and the well log data to a formation among the formations in the stratigraphic column to determine the formation top depth.

17 Claims, 11 Drawing Sheets

(51) Int. Cl.
*G01V 5/06* (2006.01)
*G01V 99/00* (2009.01)
*G06N 20/00* (2019.01)
*G06N 3/04* (2023.01)
*G01V 1/28* (2006.01)

(52) U.S. Cl.
CPC ............ *G01V 99/005* (2013.01); *G06N 3/04* (2013.01); *E21B 2200/20* (2020.05); *G01V 2210/6169* (2013.01); *G01V 2210/66* (2013.01)

(58) Field of Classification Search
CPC ...... G01V 2210/66; G01V 1/50; G01V 1/301; G01V 1/302; G01V 1/28; G01V 1/40; G01V 3/38; G01V 2210/64; G01V 2210/614; G01V 2210/6169; G01V 1/345; E21B 49/00; E21B 2200/20; E21B 43/00; E21B 44/00; E21B 7/04; E21B 47/00; E21B 41/00; G06F 30/20; G06N 20/00; G06N 3/08; G06N 3/04; G06N 3/0445; G06N 3/0454
USPC .......... 73/152.01–152.28; 166/250.01–250.2, 166/254.2; 175/40; 324/303, 323, 339; 345/419; 367/25–27, 38, 73; 702/1–18; 703/2–10
See application file for complete search history.

(56) References Cited

U.S. PATENT DOCUMENTS

| | | | | |
|---|---|---|---|---|
| 2015/0088424 | A1* | 3/2015 | Burlakov | G01V 99/00 702/6 |
| 2016/0124116 | A1* | 5/2016 | Souche | G01V 99/005 703/2 |
| 2019/0034812 | A1* | 1/2019 | Borrel | G06N 5/04 |
| 2019/0169986 | A1* | 6/2019 | Storm, Jr. | G01V 11/00 |
| 2019/0338636 | A1 | 11/2019 | Pei et al. | |
| 2019/0391295 | A1* | 12/2019 | Salman | G01V 99/005 |
| 2020/0011158 | A1* | 1/2020 | Xu | E21B 41/0092 |
| 2020/0040719 | A1 | 2/2020 | Maniar et al. | |
| 2020/0160173 | A1* | 5/2020 | Pandey | G06N 3/08 |

FOREIGN PATENT DOCUMENTS

| | | |
|---|---|---|
| WO | 2016036979 A1 | 3/2016 |
| WO | 2018208634 A1 | 11/2018 |
| WO | 2019055562 A1 | 3/2019 |
| WO | 2020028309 A1 | 2/2020 |

OTHER PUBLICATIONS

Al-Abduljabbar, Ahmad et al., "Predicting Formation Tops While Drilling Using Artificial Intelligence", SPE-192345-MS, Society of Petroleum Engineers, Apr. 2018 (9 pages).

Brazell, Seth et al., "A Machine-Learning-Based Approach to Assistive Well-Log Correlation", Petrophysics, vol. 60, No. 4, Aug. 2019, pp. 469-479 (11 pages).

Priezzhev, I. and E. Stanislav, "Application of Machine Learning Algorithms Using Seismic Data and Well Logs to Predict Reservoir Properties", Tu P6 04, 80th EAGE Conference & Exhibition 2018, Jun. 2018 (5 pages).

Konaté, Ahmed Amara et al., "Machine Learning Interpretation of Conventional Well Logs in Crystalline Rocks", Advances in Swarm and Computational Intelligence, Lecture Notes in Computer Science, Springer International Publishing, Jun. 2015, pp. 360-370 (11 pages).

International Search Report and Written Opinion of the International Searching Authority Issued in corresponding International Application No. PCT/US2020/054966, dated Jul. 16, 2021 (23 pages).

Ohl, Derek et al., "Rock Formation Characterization for Carbon Dioxide Geosequestration: 3D Seismic Amplitude and Coherency Anomalies, and Seismic Petrophysical Facies Classification, Wellington and Anson-Bates Fields, Kansas, USA", Journal of Applied Geophysics, Apr. 1, 2014 (7 pages).

\* cited by examiner

| Formation Top Comparison Table 700 | | | |
|---|---|---|---|
| | Geologist Selections 701 | Machine-Learning Model Predictions 702 | Difference 703 |
| Layer A 711 | -6220.31' | -6220.50' | 0.19' |
| Layer B 712 | -6296.60' | -6296.50' | -0.10' |
| Layer C 713 | -6380.46' | -6380.99' | 0.53' |
| Layer D 714 | -3470.64' | -3470.00' | -0.64' |
| Layer E 715 | -6211.27' | -6210.99' | -0.28' |

*FIG. 7*

METHOD AND SYSTEM FOR PREDICTING FORMATION TOP DEPTHS

BACKGROUND

Formation top predictions are commonly used in the oil and gas industry, and small variations between predicted depths and actual depths of a formation top may impact hydrocarbon exploration and production. Current formation top predictions may be performed manually, and are heavily dependent on a geologist's expertise. Consequently, human predictions introduce subjectivity and errors in the process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, seismic data regarding a geological region of interest. The method further includes obtaining, by the computer processor, well log data from a wellbore within the geological region of interest. The method further includes determining, by the computer processor, a formation top depth using the seismic data, the well log data, a stratigraphic column, and a machine-learning model. The stratigraphic column describes an order of various formations within the geological region of interest. The machine-learning model assigns a feature among the seismic data and the well log data to a formation among the formations in the stratigraphic column to determine the formation top depth.

In general, in one aspect, embodiments relate to a system that includes a logging system coupled to various logging tools and a drilling system coupled to the logging system. The system further includes a reservoir simulator that includes a computer processor. The reservoir simulator is coupled to the logging system and the drilling system. The reservoir simulator obtains seismic data regarding a geological region of interest. The reservoir simulator obtains well log data from a wellbore within the geological region of interest. The reservoir simulator determines a formation top depth using the seismic data, the well log data, a stratigraphic column, and a machine-learning model. The stratigraphic column describes an order of various formations within the geological region of interest. The machine-learning model assigns a feature among the seismic data and the well log data to a formation among the formations in the stratigraphic column to determine the formation top depth.

In general, in one aspect, embodiments relate to a non-transitory computer readable medium storing instructions executable by a computer processor. The instructions obtain seismic data regarding a geological region of interest. The instructions obtain well log data from a wellbore within the geological region of interest. The instructions determine a formation top depth using the seismic data, the well log data, a stratigraphic column, and a machine-learning model. The stratigraphic column describes an order of various formations within the geological region of interest. The machine-learning model assigns a feature among the seismic data and the well log data to a formation among the formations in the stratigraphic column to determine the formation top depth.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 5A, 5B, 6, 7, 8, and 9 show examples in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for predicting formation top depths using a machine-learning model. For example, a machine-learning model may use a single variable input or multiple variable inputs, such as well logs and seismic traces, in order to determine one or more formation top depths. In particular, time-series data may be obtained by recording sensors that measure a certain physical or chemical property of a geological formation and store this measured property as a time or depth record. For well logs, the order of recording the time series readings may be performed naturally from top to bottom in a wellbore where readings are obtained during a drilling operation. Thus, sensor measurements may be obtained from younger layers to older layers with respect to geological events. Accordingly, a sensor measurement may be correlated to a geological time event in a geological history of one or more formations. Using the timewise nature of geological history, a formation top depth may be predicted as well as analyzed further to determine if the formation top depth is valid.

Figure 1:
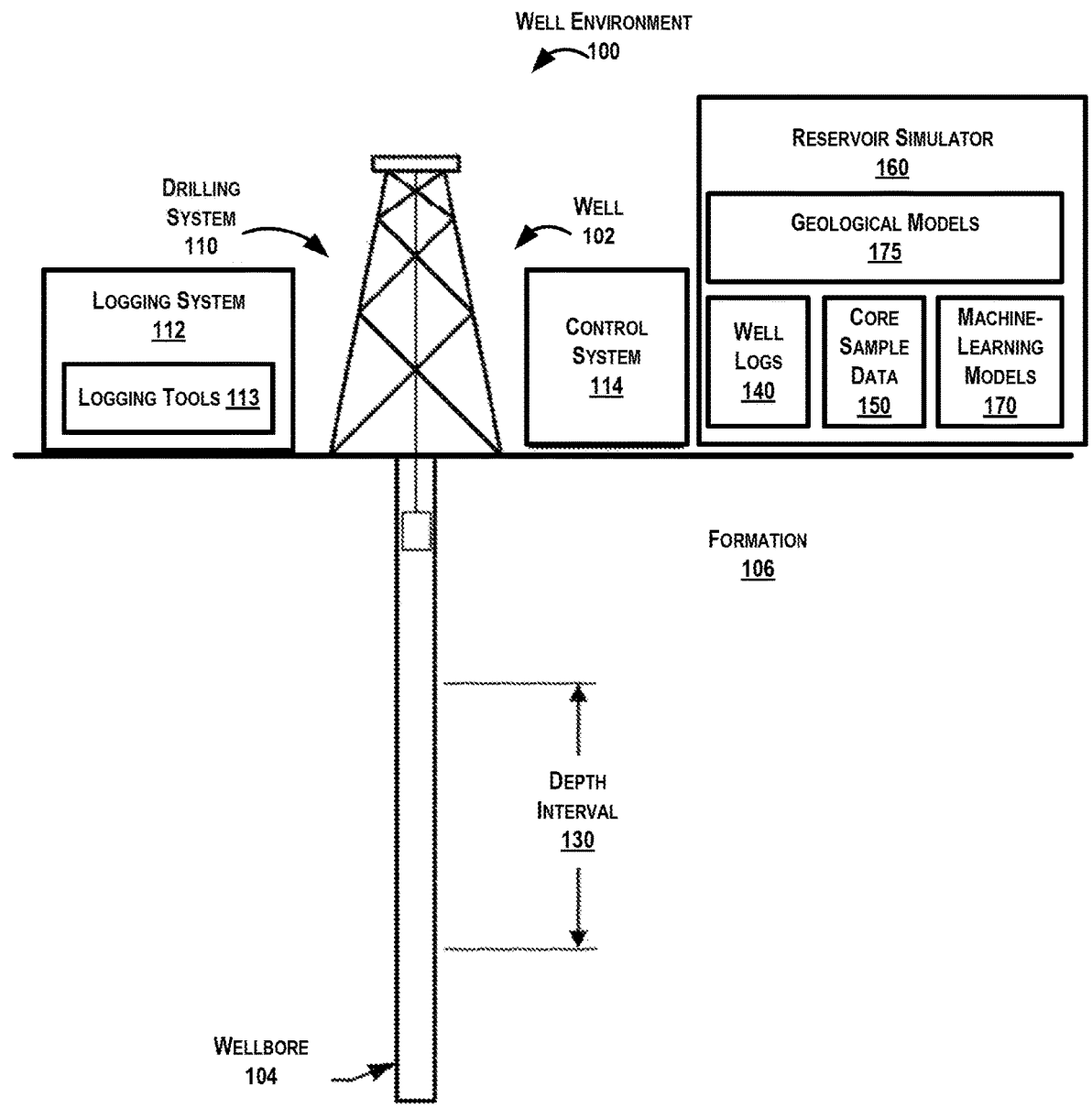
FIGS. 1, 2, and 3 show systems in accordance with one or more embodiments.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, density, water saturation, and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir simulator (160), a reservoir simulator (160) may include hardware and/or software with functionality for storing and analyzing well logs (140), core sample data (150), seismic data, and/or other types of data to generate and/or update one or more geological models (175). Geological models may include geochemical or geomechanical models that describe structural relationships within a particular geological region. While the reservoir simulator (160) is shown at a well site, in some embodiments, the reservoir simulator (160) may be remote from a well site. In some embodiments, the reservoir simulator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir simulator (160) may include a computer system that is similar to the computer system (1000) described below with regard to FIG. 10 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., a targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, density, water saturation, and the like. The resulting logging measurements may be stored and/or processed, for example, by the control system (114), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine density measurements or porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. In some embodiments, gamma ray logging is used to measure naturally occurring gamma radiation to characterize rock or sediment regions within a wellbore. In particular, different types of rock may emit different amounts and different spectra of natural gamma radiation. For example, gamma ray logs may distinguish between shales and sandstones/carbonate rocks because radioactive potassium may be common to shales. Likewise, the cation exchange capacity of clay within shales also results in higher absorption of uranium and thorium further increasing the amount of gamma radiation produced by shales.

Figure 2:
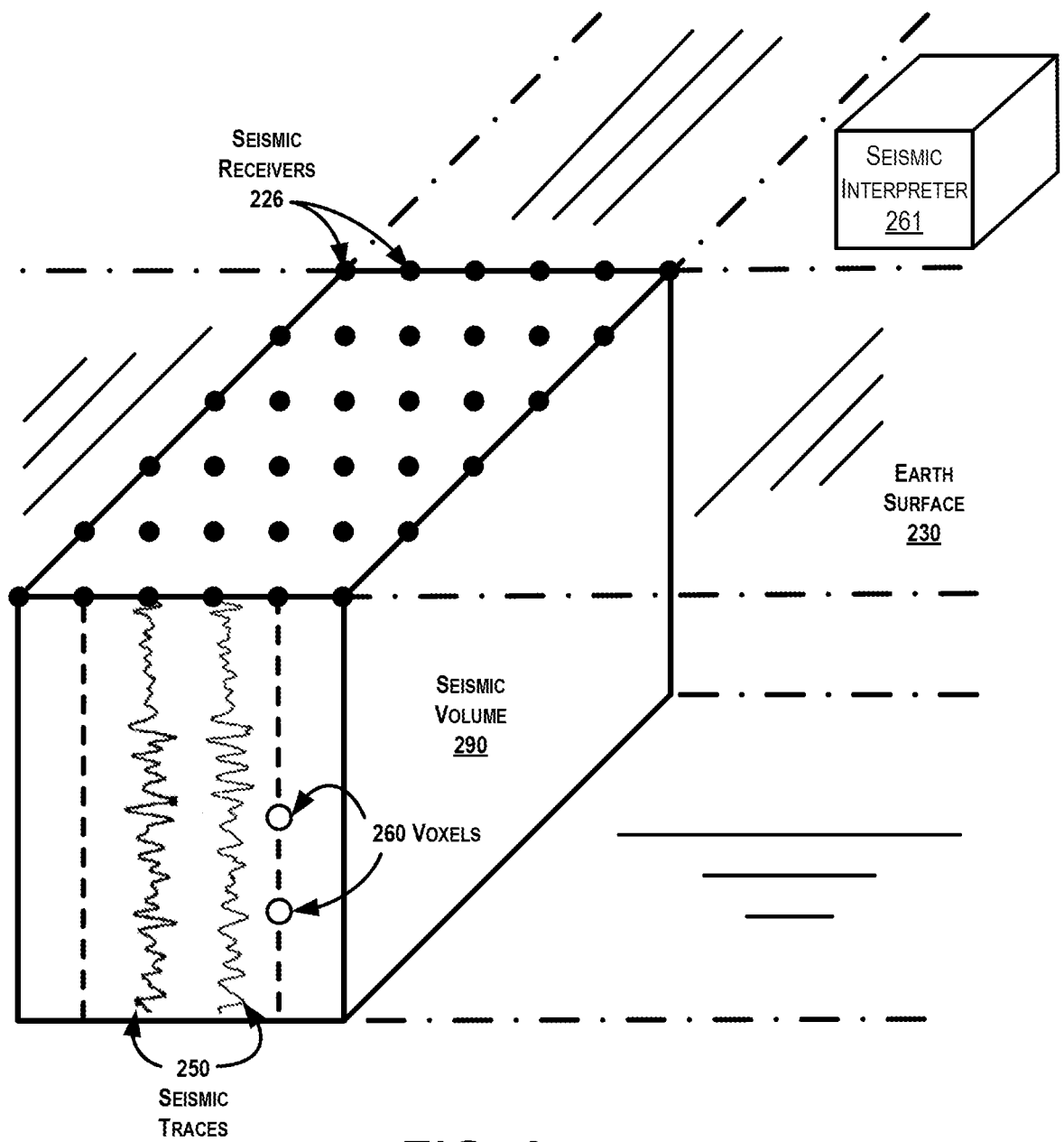

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic data set of seismic traces. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Furthermore, seismic data may refer to time domain data that is acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. In some embodiments, seismic data may also refer to depth data. For example, seismic data may be processed, e.g., using a seismic inversion operation, to generate a velocity model of a subterranean formation, or a migrated seismic image of a rock formation within the earth's surface.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions. With respect to the seismic interpreter (261), a seismic interpreter (261) may include a processor and hardware and/or software with functionality for interpreting, processing, and/or acquiring seismic data. In some embodiments, a seismic interpreter (261) is a component within a reservoir simulator (e.g., reservoir simulator (160)).

Figure 3:
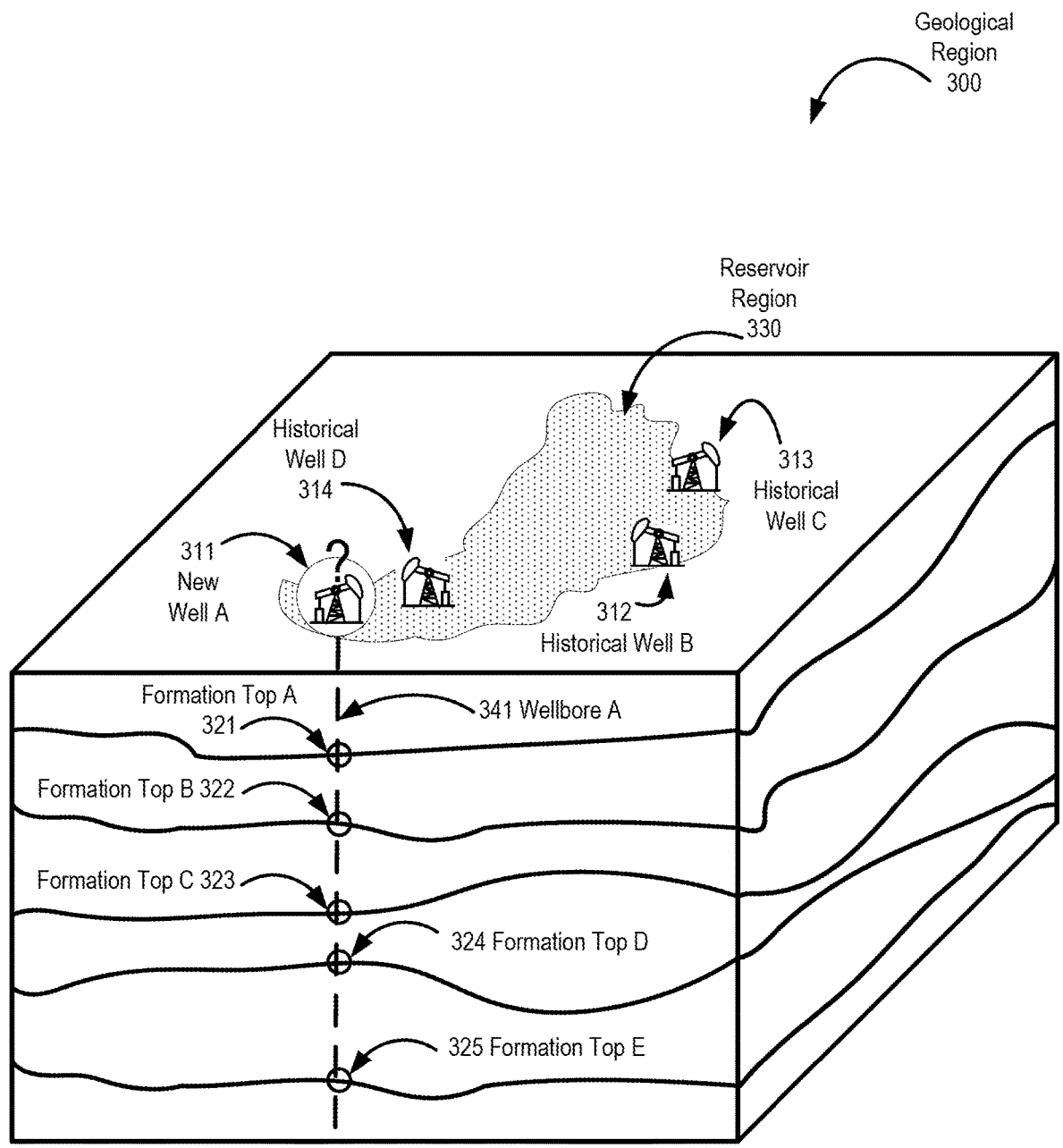

Turning to FIG. 3, FIG. 3 shows a schematic diagram in accordance with one or more embodiments. As illustrated in FIG. 3, FIG. 3 shows a geological region (300) that may include one or more reservoir regions (e.g., reservoir region (330)) with various wells (i.e., new well A (311), historical well B (312), historical well C (313), and historical well D (314)). Historical wells may include wells where the depth of one or more formation tops have previously been determined, e.g., by drilling through various formations and/or predicting the location of formation tops from well log data. The term "formation top" may refer to a location of a surface of a formation that is in closest proximity to the well. For example, a well path of a vertical well may drill to a formation top prior to reaching the remaining portion of the respective formation. In FIG. 3, wellbore A (341) of new well A (311) is shown being drilled through various formation tops (i.e., formation top A (321), formation top B (322), formation top C (323), formation top D (324), formation top E (325)).

Returning to FIG. 1, geosteering may be used to position the drill bit or drill string of the drilling system (110) relative to a boundary between different subsurface layers (e.g., overlying, underlying, and lateral layers of a pay zone) during drilling operations. In particular, measuring rock properties during drilling may provide the drilling system (110) with the ability to steer the drill bit in the direction of desired hydrocarbon concentrations. As such, a geosteering system may use various sensors located inside or adjacent to the drilling string to determine different rock formations within a well path. In some geosteering systems, drilling tools may use resistivity or acoustic measurements to guide the drill bit during horizontal or lateral drilling.

Returning to a reservoir simulator (160), a reservoir simulator (160) may include hardware and/or software with functionality for generating one or more machine-learning models (170) for use in analyzing the formation (106). For example, the reservoir simulator (160) may store well logs (140) and data regarding core samples (150), and further analyze the well log data, the core sample data, seismic data, and/or other types of data to generate and/or update one or more machine-learning models (170) and/or one or more geological models (175). Thus, different types of machine-learning models may be trained, such as convolutional neural networks, deep neural networks, recurrent neural networks, support vector machines, decision trees, inductive learning models, deductive learning models, supervised learning models, etc. In some embodiments, the reservoir simulator (160) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Keeping with FIG. 1, a well path of a wellbore (104) may be updated by the control system (114) using a geological model (e.g., one of the geological models (175)). For example, a control system (114) may communicate geosteering commands to the drilling system (110) based on well data updates that are further adjusted by the reservoir simulator (160) using a geological model. As such, the control system (114) may generate one or more control signals for drilling equipment based on an updated well path design and/or a geological model. In some embodiments, the reservoir simulator (160) determines one or more formation top depths from seismic data and/or well log data. The reservoir simulator (160) may use these formation top depths to adjust the well path of the wellbore (104) accordingly.

While FIGS. 1, 2, and 3 shows various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
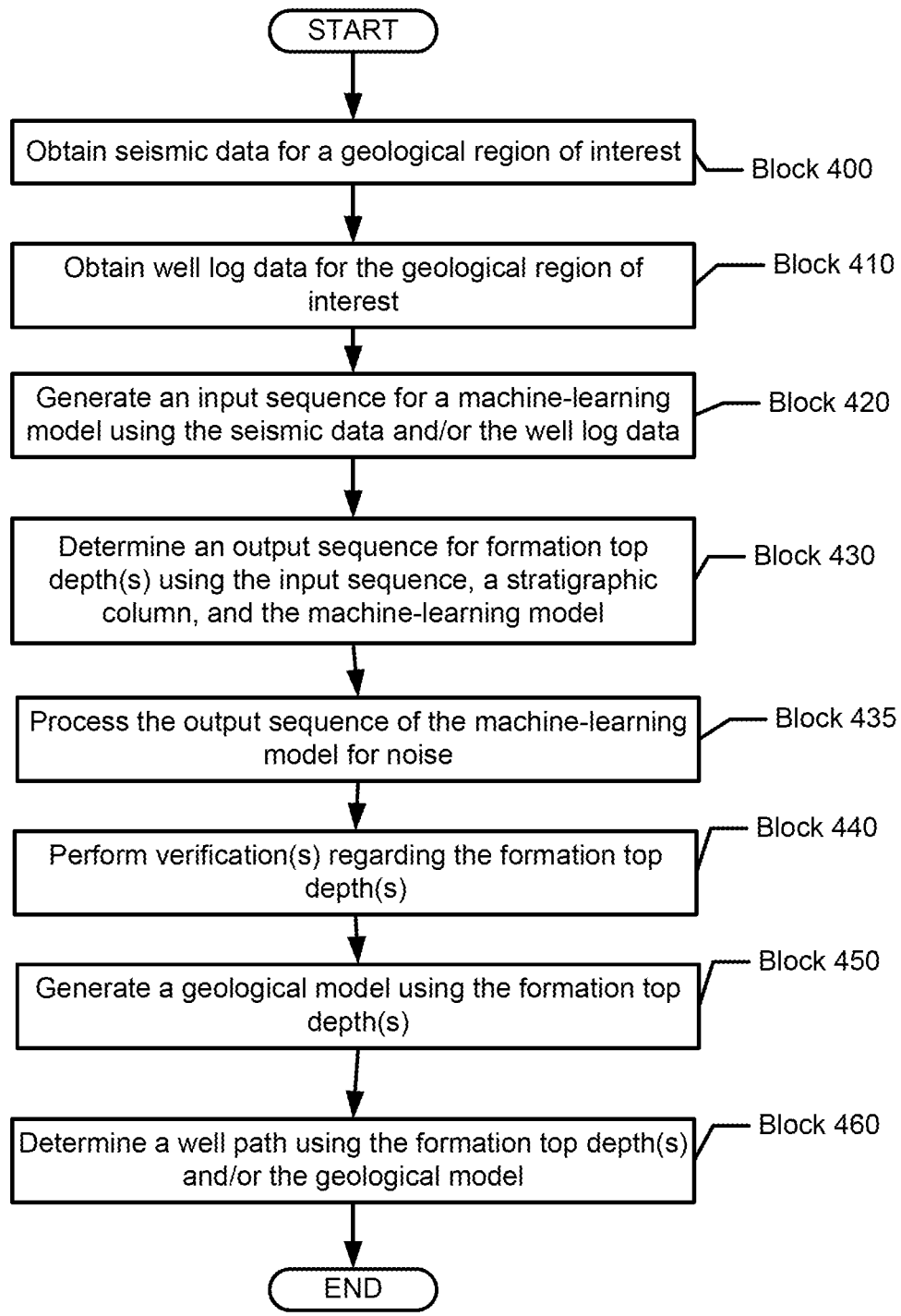
FIG. 4 shows a flowchart in accordance with one or more embodiments.

Turning to FIG. 4, FIG. 4 shows a flowchart in accordance with one or more embodiments. Specifically, FIG. 4 describes a general method for determining formation top depths using machine learning. One or more blocks in FIG. 4 may be performed by one or more components (e.g., reservoir simulator (160)) as described in FIGS. 1, 2 and/or 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, seismic data are obtained for a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data, such as seismic volume (290), described above in FIG. 2 and the accompanying description.

In Block 410, well log data are obtained for a geological region of interest in accordance with one or more embodiments. For example, seismic data and/or well log data may be obtained from various databases, preprocessed, and/or augmented to serve as training data for a machine-learning model or as input data for predicting formation top depths. In some embodiments, the well log data may be similar to the well logs (140) described above in FIG. 1 and the accompanying description.

In Block 420, an input sequence is generated for a machine-learning model using seismic data and/or well log data in accordance with one or more embodiments. More specifically, the input sequence may correspond to a series of features in a time series vector. Likewise, some embodiments use multiple feature vectors as inputs to a machine-learning model. Given a single point within a well, for example, several measurements may be obtained for the same point, e.g., using gamma ray measurements, density measurements, resistivity measurements, and/or seismic measurements. Thus, seismic data and/or well log data may be converted to one or more input sequences for mapping input features to a geological time event sequence. As such, a machine-learning model may uses all or multiple points in an input sequence to determine a full context of a particular point or location. For example, deep machine learning may use temporal data before and after a respective point in the input sequence in order to determine a corresponding class for a feature in an output sequence, e.g., below in Block 430.

In some embodiments, the machine-learning model is a deep neural network that includes multiple dilated layers. For example, a dilated layer may be a convolutional layer that includes a dilation factor. In some embodiments, the machine-learning model is a model with multiple input streams such as convolutional and recurrent streams that are concatenated at a final hidden layer. In some embodiments, the machine-learning model is a temporal convolutional network with multiple dilated layers with different dilation factors.

In Block 430, an output sequence for one or more formation top depths is determined using an input sequence, a stratigraphic column, and a machine-learning model in accordance with one or more embodiments. In some embodiments, for example, a stratigraphic column provides a baseline reference for time-series samples of well log data and/or seismic data. By mapping this time series data to a stratigraphic column to produce an output sequence, some geological time events may be marked as interest points, e.g., specific features in a geological region of interest that are known in advance. As geological time events become progressively older as a wellbore proceeds into the subsurface, geological time events in a time series may follow this property imposed by the natural process of sedimentation as described within the stratigraphic column.

Figure 5A:
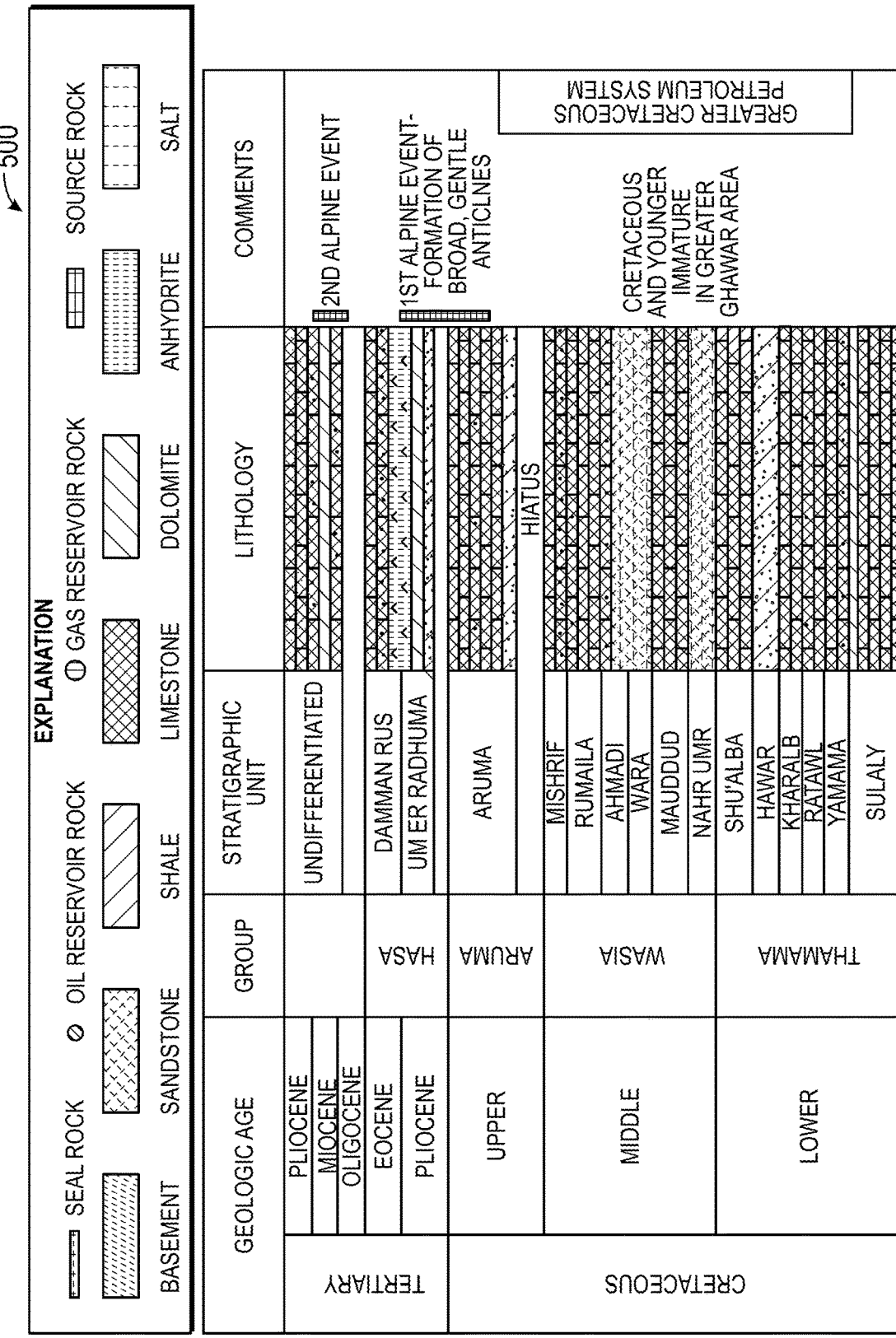
Figure 5B:
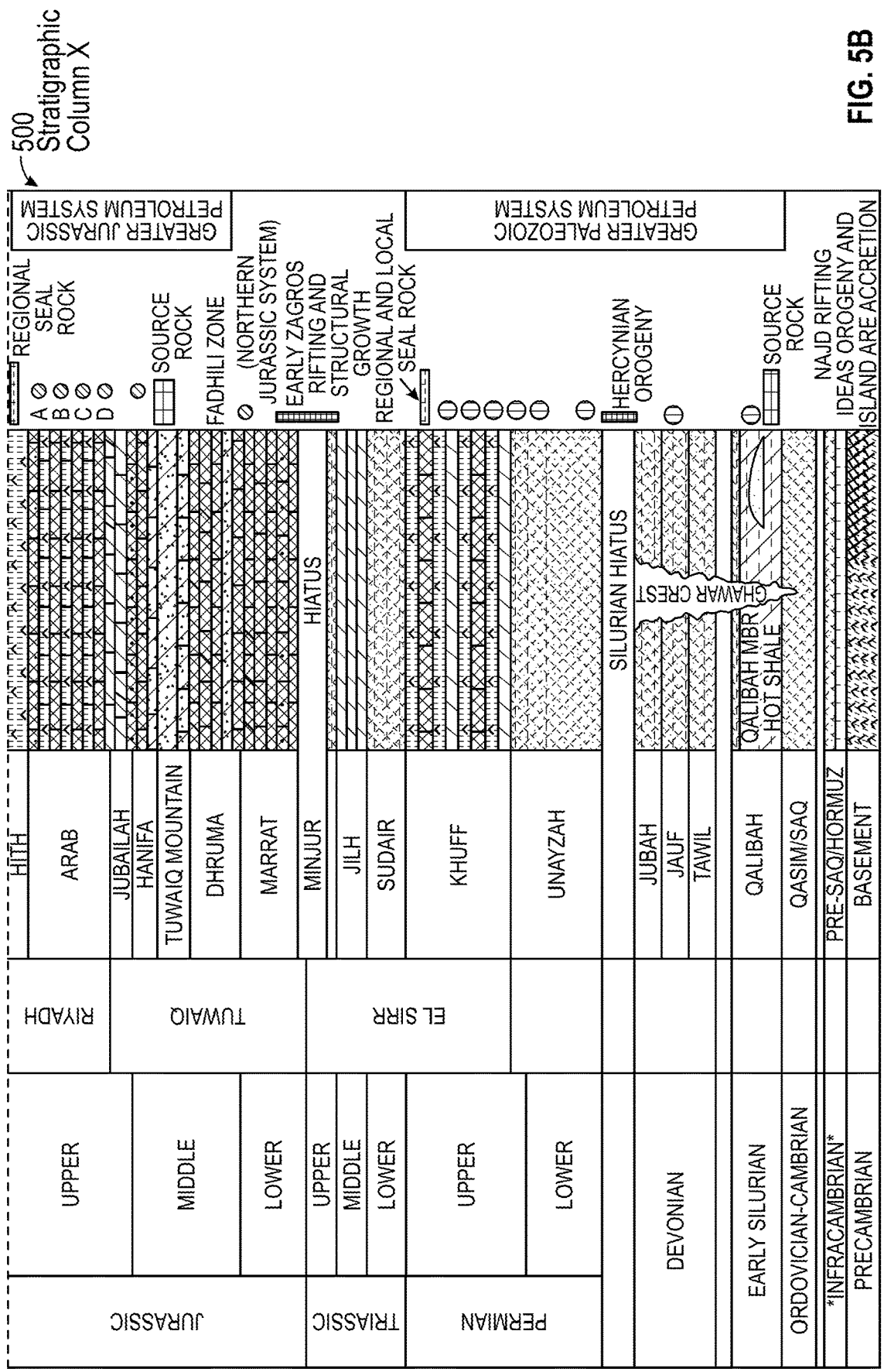

Based on the features identified in an input sequence, a machine-learning model may classify a particular point in the well as belonging to a predetermined class in a stratigraphic column, e.g., as a particular stratigraphic unit in an output sequence of the machine-learning model. An example stratigraphic column is shown in FIGS. 5A and 5B, where FIG. 5A is closest to the well surface and FIG. 5B is the stratigraphic column farthest into the earth. In particular, FIGS. 5A and 5B illustrate various classes of formations and layers based on geological age, stratigraphic units, and lithology.

To illustrate this prediction process, for example, a point may be selected at 10000 feet of measured depth (MD) in a well. Using input data from different sensors, machine learning may be performed based on the different measurements to assign this point to a specific layer (e.g., a particular interval on a stratigraphic column). As such, a machine-learning model may determine a one-to-one mapping for each point of an input sequence to respective individual classes of a stratigraphic column to form an output. Accordingly, a final output sequence from the machine-learning model may be a sequence of mapped classes. In another embodiment, a depth value is output directly for each formation top (e.g., an output sequence for 10 formation tops may have a corresponding depth value for each of the 10 formation tops).

In some embodiments, the stratigraphic column is generated using well log data from various historical wells around the geological region of interest. As such, the stratigraphic column may be known at a well prior to drilling a new wellbore for a new well based on past information collected for the geological region of interest. Likewise, the stratigraphic column may be determined using one or more seismic surveys for a geological region of interest.

Figure 6:
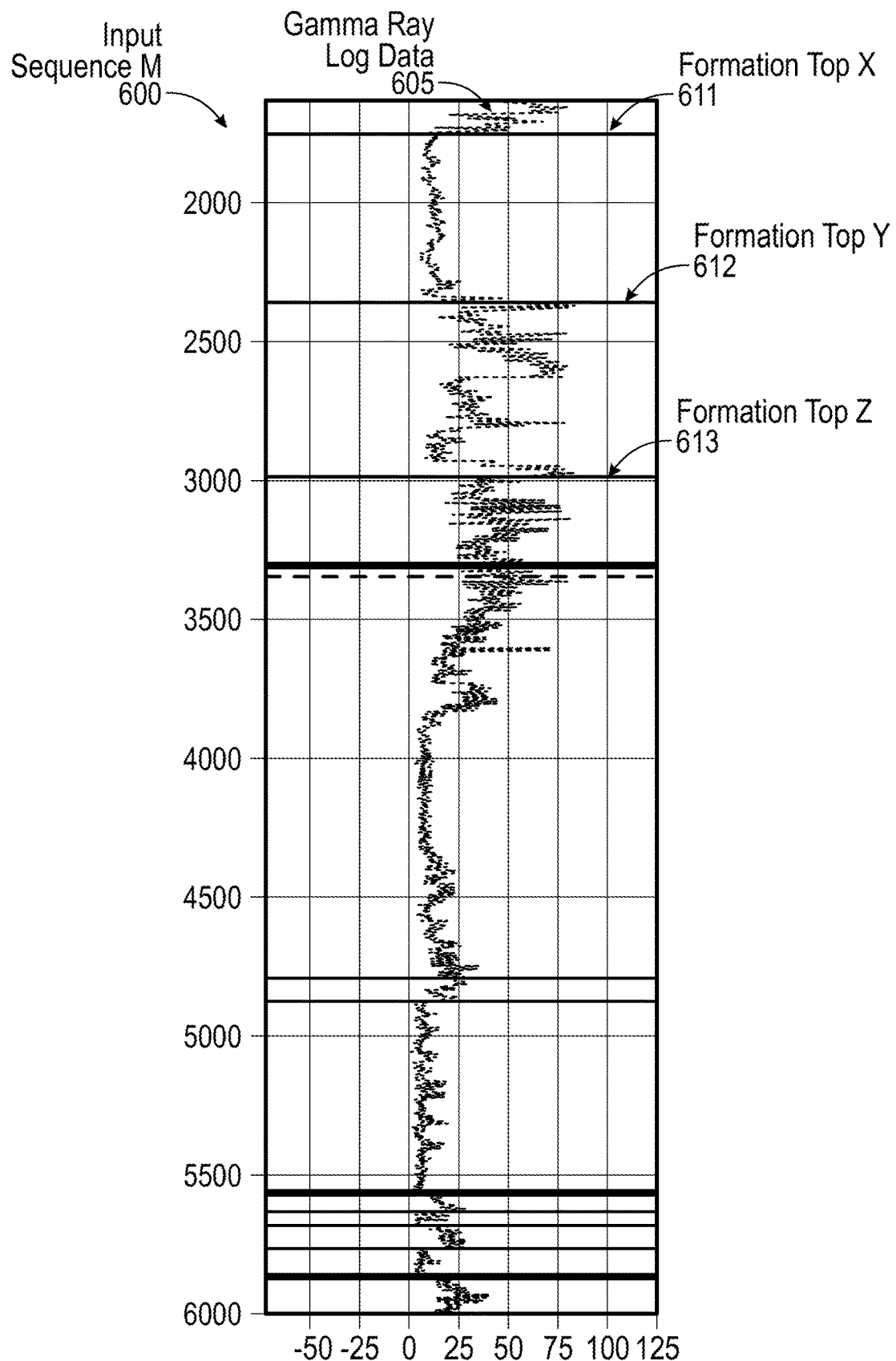

Turning to FIG. 6, FIG. 6 shows an example of an input sequence for a machine-learning model in accordance with one or more embodiments. As shown in FIG. 6, an input sequence M (600) includes gamma ray log data (605) with various formation tops (e.g., formation top X (611), formation top Y (612), formation top Z (613)) highlighted as boundaries. The input sequence M (600) may be used in a training process for a machine-learning model to map to the desired geological time events, e.g., the formation tops (611, 612, 613). Based on predictions by a machine-learning model with respect to the formation tops (611, 612, 613), the machine-learning model may be updated accordingly to reduce error associated with the predicted formation tops.

Turning to FIG. 7, FIG. 7 shows an example of formation top depth predictions in comparison to geologist selections in accordance with one or more embodiments. As shown in FIG. 7, a formation top comparison table (700) illustrates a geologist selection (701) of a formation top depth for a respective layer alongside a machine-learning model prediction (702) of the formation top depth for the same layer. The formation top comparison table (700) also shows the difference (703) between a predicted depth by a machine-learning model as well as the geologist selections (701) of depths. Here, formation top depths are determined for various formation layers, i.e., layer A (711), layer B (712), layer C (713), layer D (714), and layer E (715). Accordingly, the output of this machine-learning model in this example highly resembles the geologist selections (701).

Figure 8:
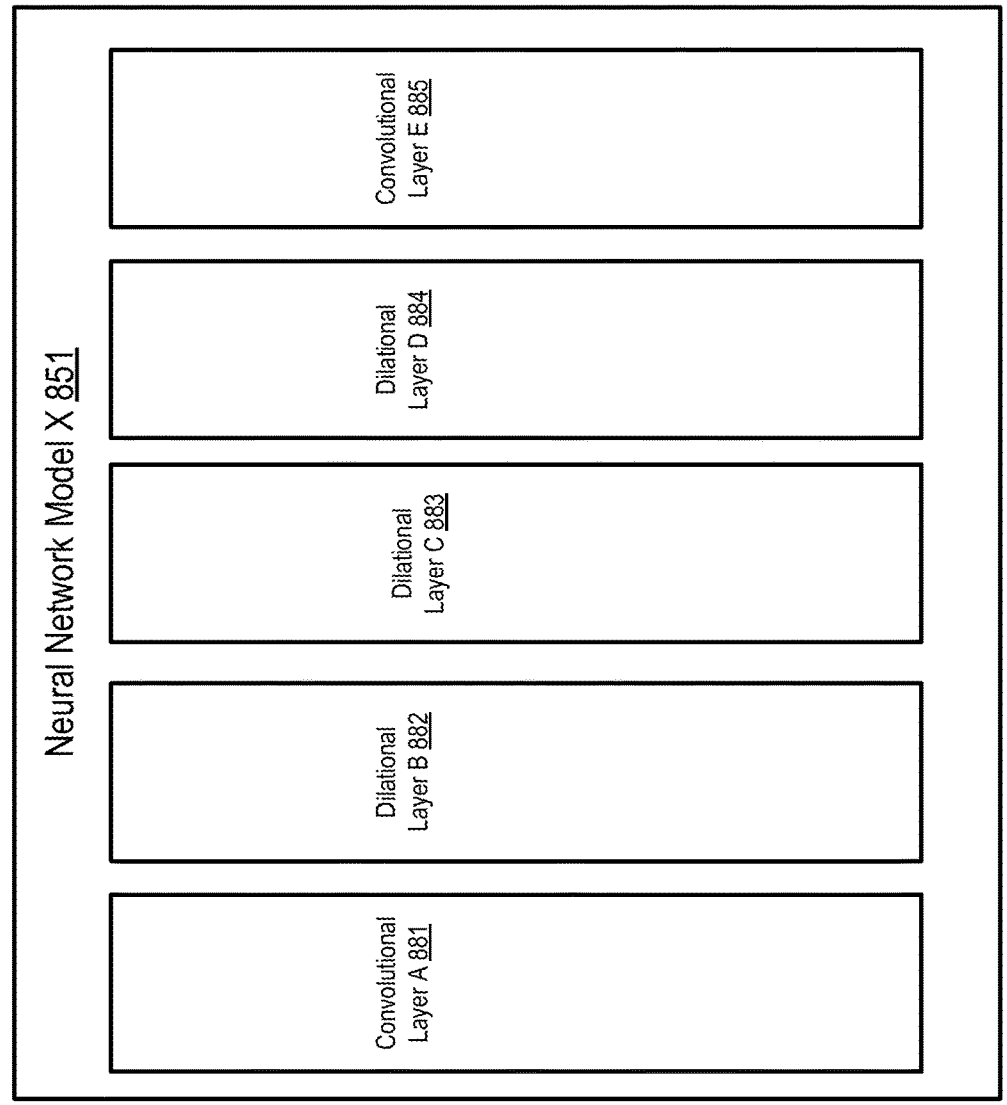

Turning to FIG. 8, FIG. 8 provides an example of generating a machine-learning model to predict formation top depths in accordance with one or more embodiments. The following example is for explanatory purposes only and not intended to limit the scope of the disclosed technology.

In FIG. 8, a neural network model X (851) is trained using a supervised learning algorithm Q (830) for predicting various formation top depths within a geological region (e.g., formation top depth Q (890)). In particular, the neural network model X includes five hidden layers, i.e., two convolutional layers (i.e., convolutional layer A (881), convolutional layer E (885)) and three dilational layers (i.e., a dilational layer B (882), a dilational layer C (883), and a dilational layer D (884)). Moreover, the neural network model X (851) obtains two different variables for determining formation top depths, (i.e., seismic data input sequence X (810) and a gamma ray log input sequence Y (820)) as inputs for training.

Returning to FIG. 4, in Block 435, an output sequence from a machine-learning model is processed for noise in accordance with one or more embodiments. By classifying each point in the input sequence using a machine-learning model, for example, each point may provide a vote for a final answer in the output sequence. Thus, the initial output sequence may provide some noise or incorrect class identifications for use in determining formation top depths. Using machine learning, however, each point may contribute a single vote that indicate whether the point is before or after the exact depth of the formation top, e.g., through binary segmentation discussed below. By using this voting mechanism, uncertainty of determining single answers may be minimized.

In some embodiments, a binary classification is assigned for each geological time event. For example, one segment in time series data may be younger than a current data point (e.g., with respect to a seismic measurement or a well log measurement) and another segment in time series data is older than the current data point. A sequence number may be assigned to each data sample progressively from top to bottom. This sequence number may be associated with the output of a machine-learning model. However, in extraction time, samples may be assigned a binary value to either belong to the older or the younger geological time event. These labeling procedures may thus minimize the amount of searching performed by a machine-learning model.

For illustration of this binary classification process, an example noisy output sequence may be "1111161113112222224222333334444144445555255525552555". In this noisy output sequence, various values in the sequence may identify different classes in a respective stratigraphic column. For example, a third formation top location may be associated with the value '3' and segment sequences may be separated as being less than '3' or greater than '3'. Thus, a reservoir simulator may binarize values of the noise output sequence to be '0' for values less than '3' and '1' for values greater than '3'. However, the output sequence may still have significant noise. Accordingly, a cross-entropy optimization of noisy output data may obtain an optimal location of a formation top depth by using an objective function that minimizes differences between desired outputs in relation to the noisy output. For example, a cross entropy value may be determined between this illustrated binarized output sequence and another vector that assumes the true location at each point N. Thus, the cross entropy value is obtained at each N location, and thereby, a minimum value of the cross entropy may be identified as the correct formation top location.

In Block 440, one or more verifications are performed regarding one or more formation top depths in accordance with one or more embodiments. After determining formation top depths for a geological region of interest, one or more verification analyses may be performed to determine a valid depth. For example, geological erosion of a formation or missing sensor values during acquisition of well logs or seismic data may result in the loss of necessary information for a valid prediction by a machine-learning model. In one verification analysis, for example, a reservoir simulator may automatically determine whether a thickness of a respective formation is greater than a predetermined erosion threshold. The predetermined erosion threshold may correspond to a number associated with a particular well location. If the thickness of a formation is less than the predetermined erosion threshold, the predicted formation top depth may be determined as invalid and thus excluded from consideration. To determine the thickness of a formation, a reservoir simulator may use the distance between two consecutive formation top depths.

In some embodiments, a reservoir simulator determines whether a formation top depth is within a predetermined threshold range of missing sensor values. For this verification analysis, a reservoir simulator may determine a formation boundary from a side of the formation top in question. In analyzing the formation boundary, the reservoir simulator may determine whether the boundary lies on missing sensor values or in close proximity to missing sensor value according to a predetermined threshold range.

In Block 450, a geological model is generated for a geological region of interest using one or more formation top depths in accordance with one or more embodiments. For example, the geological model may be updated in real-time using one or more predicted formation top depths during a drilling operation in a geological region of interest. The geological model may include 2-D maps and/or 3D maps of one or more formations. Likewise, a geological model may be used in hydrocarbon exploration and/or production for the geological region of interest. For example, the geological model may be used in basin modeling or reservoir simulations by a reservoir simulator. The geological model may be similar to the geological models (175) described above in FIG. 1 and the accompanying description.

In Block 460, a well path is determined using one or more formation top depths and/or a geological model in accordance with one or more embodiments. For example, a control system for a drilling system may perform various geosteering operations at the same time based on formation top depth predictions and/or updates while drilling. For more information on geosteering, see FIG. 1 above and the accompanying description.

Figure 9:
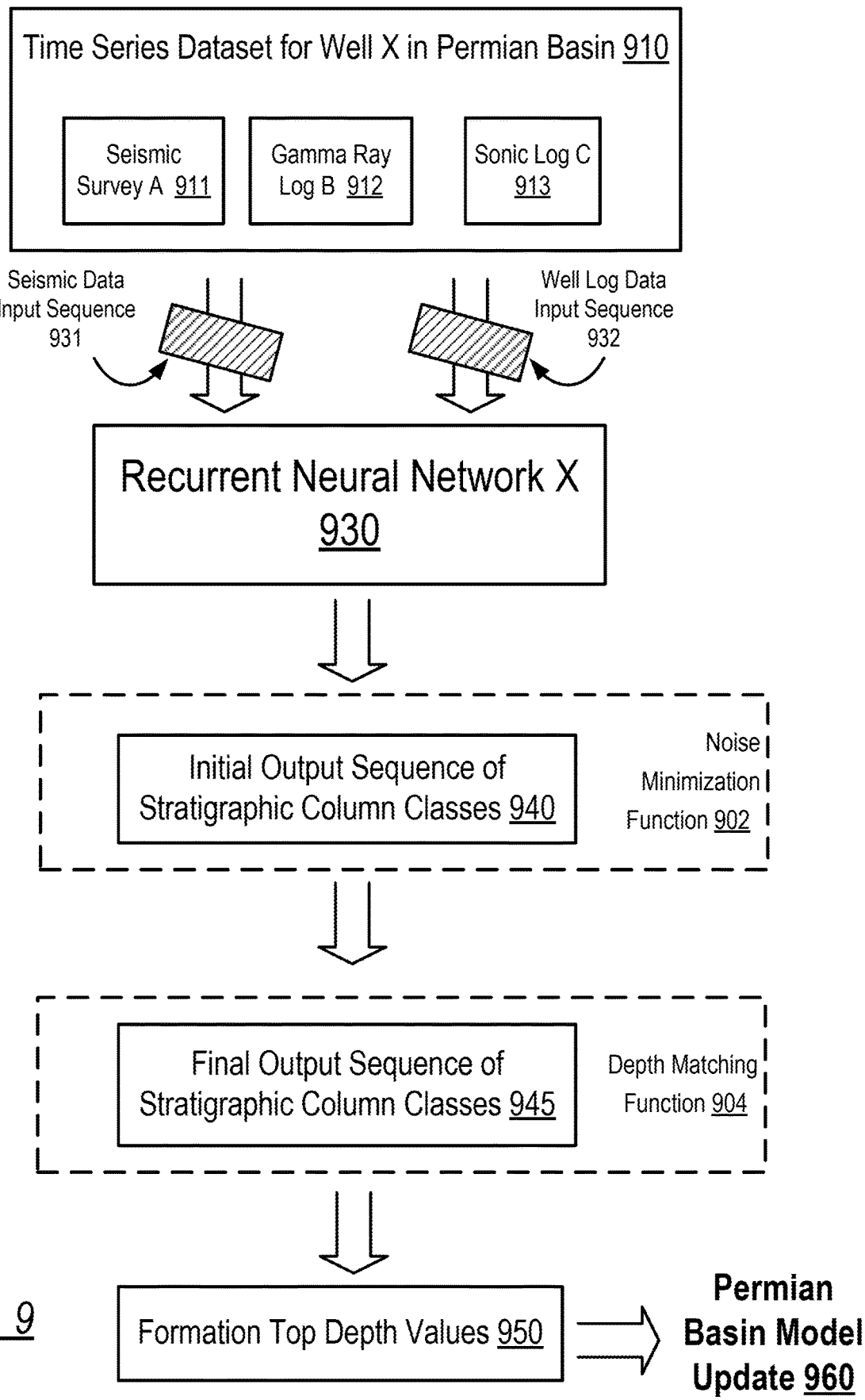

Turning to FIG. 9, FIG. 9 provides an example of determining formation top depths in accordance with one or more embodiments. The following example is for explanatory purposes only and not intended to limit the scope of the disclosed technology. In FIG. 9, FIG. 9 shows a time series dataset (910) for well X in the Permian Basin. The time series dataset (910) includes data from a seismic survey A (911), gamma ray log B (912), and a sonic log C (913). Here, a reservoir simulator determines two input sequences (i.e., seismic data input sequence (931), well log data input sequence (932)) for input to a recurrent neural network X (930).

Keeping with FIG. 9, the recurrent neural network X (930) generates an initial output sequence of stratigraphic column classes (940) for well X. However, the initial output sequence (940) may include invalid predictions or include noise from the prediction process. The reservoir simulator then applies a noise minimization function (902) (e.g., similar to Block 435 above) to the initial output sequence (940) to produce a final output sequence of stratigraphic column classes (945). Accordingly, the reservoir simulator then uses a depth matching function (904) to determine formation top depth values (950) from the final output sequence (945), e.g., by matching measured depth values of measurements in the input sequences (931, 932) to the determined stratigraphic column classes of the final output sequence (945). Finally, the reservoir simulator uses the formation top depth values (950) to generate an update (960) for a Permian Basin model.

Figure 10:
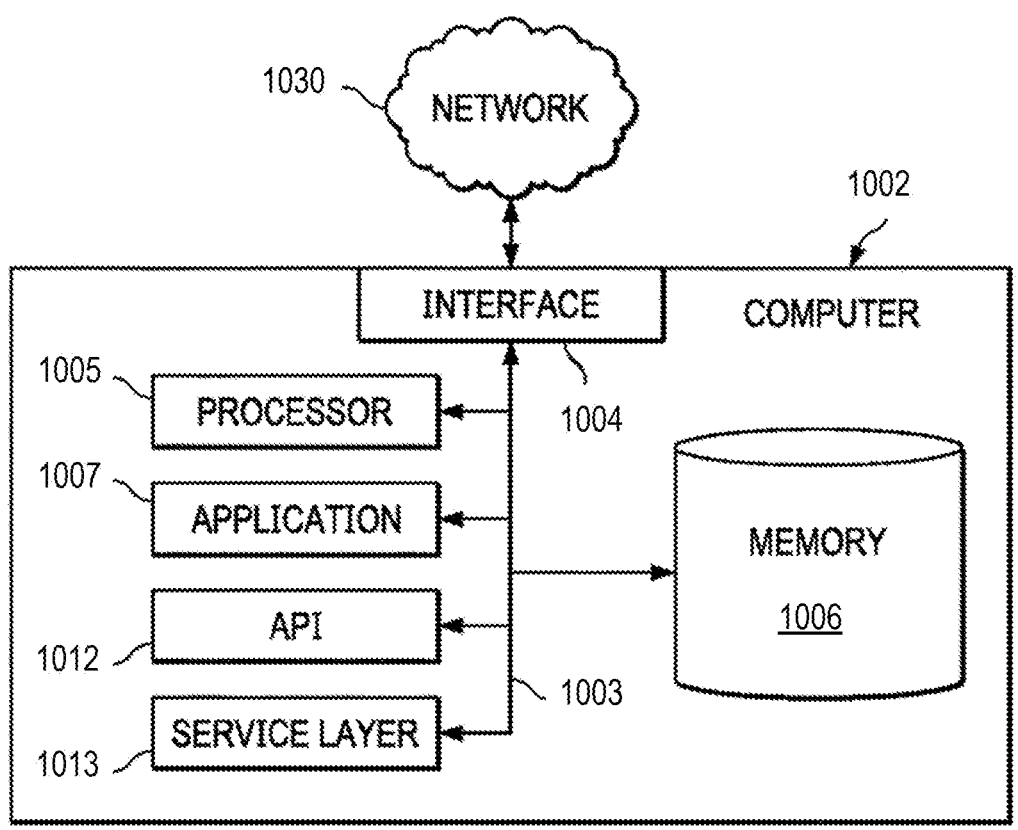
FIG. 10 shows a computer system in accordance with one or more embodiments.

Embodiments may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or other suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), each computer (1002) communicating over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a computer processor, seismic data regarding a geological region of interest;
   obtaining, by the computer processor, well log data from a wellbore within the geological region of interest; and
   determining, by the computer processor, a plurality of formation top depths for a plurality of formations using the seismic data, the well log data, a stratigraphic column, and a machine-learning model,
   wherein the stratigraphic column describes an order of the plurality of formations within the geological region of interest, and
   wherein the machine-learning model assigns one or more features among the seismic data and the well log data to a formation among the plurality of formations in the stratigraphic column to determine the plurality of formation top depths;
   determining, by the computer processor, a thickness of a respective formation among the plurality of formations using consecutive formation top depths among the plurality of formation top depths; and
   determining, by the computer processor, whether a respective formation top depth among the plurality of formation top depths is invalid due to the respective formation being eroded,
   wherein the respective formation top is determined to be invalid in response to the thickness of the respective formation being less than a predetermined erosion threshold.

2. The method of claim 1, further comprising:
   determining, by the computer processor, a well path through the geological region of interest using the plurality of formation top depths; and
   performing the well path using a drilling system.

3. The method of claim 1, further comprising:
   processing an output sequence of the machine-learning model using binary segmentation to produce a binary sequence,
   wherein the binary sequence is further processed using a cross entropy analysis to determine the plurality of formation top depths.

4. The method of claim 1,
   wherein the machine-learning model is a deep neural network comprising a plurality of dilation layers,
   wherein a respective dilation layer among the plurality of dilation layers is a convolutional layer that uses a predetermined dilation factor.

5. The method of claim 1, further comprising:
   generating a first input sequence using the seismic data; and
   generating a second input sequence using the well log data,
   wherein the machine-learning model determines a predicted formation top depth using the first input sequence and the second input sequence.

6. The method of claim 1,
   wherein the seismic data and the well log data are processed as time-series inputs to the machine-learning model,
   wherein at least one formation top depth among the plurality of formation top depths corresponds to a geological time event in an output sequence from the machine-learning model that is determined using time-series data before and after the geological time event.

7. The method of claim 1,
   wherein the well log data comprise a plurality of gamma ray logs that are acquired in real-time during a drilling operation at a wellbore.

8. A method, comprising:
   obtaining, by a computer processor, seismic data regarding a geological region of interest;
   obtaining, by the computer processor, well log data from a wellbore within the geological region of interest; and
   determining, by the computer processor, a formation top depth using the seismic data, the well log data, a stratigraphic column, and a machine-learning model, wherein the stratigraphic column describes an order of a plurality of formations within the geological region of interest, and wherein the machine-learning model assigns one or more features among the seismic data and the well log data to a formation among the plurality of formations in the stratigraphic column to determine the formation top depth; and determining, by the computer processor, that the formation top depth is within a predetermined threshold range of missing seismic data values or missing well log values, wherein the formation top depth is excluded from an update to a geological model in response to determining that the formation top depth is within the predetermined threshold range.

9. A system, comprising:

a logging system coupled to a plurality of logging tools;

a drilling system coupled to the logging system; and a reservoir simulator comprising a computer processor, wherein the reservoir simulator is coupled to the logging system and the drilling system, the reservoir simulator comprising functionality for:

obtaining seismic data regarding a geological region of interest;

obtaining well log data from a wellbore within the geological region of interest; and determining a plurality of formation top depths for a plurality of formations using the seismic data, the well log data, a stratigraphic column, and a machine-learning model, wherein the stratigraphic column describes an order of the plurality of formations within the geological region of interest, and wherein the machine-learning model assigns one or more features among the seismic data and the well log data to a formation among the plurality of formations in the stratigraphic column to determine the plurality of formation top depths;

determining a thickness of a respective formation among the plurality of formations using consecutive formation top depths among the plurality of formation top depths; and determining whether a respective formation top depth among the plurality of formation top depths is invalid due to the respective formation being eroded, wherein the respective formation top is determined to be invalid in response to the thickness of the respective formation being less than a predetermined erosion threshold.

10. The system of claim 9, wherein the drilling system further comprises functionality for:

performing a well path through the geological region of interest using the plurality of formation top depths.

11. The system of claim 9, wherein the reservoir simulator further comprises functionality for:

generating a first input sequence using the seismic data; and generating a second input sequence using the well log data, wherein the machine-learning model determines a predicted formation top depth using the first input sequence and the second input sequence.

12. The system of claim 9, wherein the seismic data and the well log data are processed as time-series inputs to the machine-learning model, wherein at least one formation top depth among the plurality of formation top depths corresponds to a geological time event in an output sequence from the machine-learning model that is determined using time-series data before and after the geological time event.

13. A system, comprising:

a logging system coupled to a plurality of logging tools;

a drilling system coupled to the logging system; and a reservoir simulator comprising a computer processor, wherein the reservoir simulator is coupled to the logging system and the drilling system, the reservoir simulator comprising functionality for:

obtaining seismic data regarding a geological region of interest;

obtaining well log data from a wellbore within the geological region of interest; and determining a formation top depth using the seismic data, the well log data, a stratigraphic column, and a machine-learning model, wherein the stratigraphic column describes an order of a plurality of formations within the geological region of interest, and wherein the machine-learning model assigns one or more features among the seismic data and the well log data to a formation among the plurality of formations in the stratigraphic column to determine the formation top depth; and determining that the formation top depth is within a predetermined threshold range of missing seismic data values or missing well log values, wherein the formation top depth is excluded from an update to a geological model in response to determining that the formation top depth is within the predetermined threshold range.

14. A non-transitory computer readable medium storing instructions executable by a computer processor, the instructions comprising functionality for:

obtaining seismic data regarding a geological region of interest;

obtaining well log data from a wellbore within the geological region of interest; and determining a plurality of formation top depths for a plurality of formations using the seismic data, the well log data, a stratigraphic column, and a machine-learning model, wherein the stratigraphic column describes an order of the plurality of formations within the geological region of interest, and wherein the machine-learning model assigns one or more features among the seismic data and the well log data to a formation among the plurality of formations in the stratigraphic column to determine the plurality of formation top depths;

determining a thickness of a respective formation among the plurality of formations using consecutive formation top depths among the plurality of formation top depths; and determining whether a respective formation top depth among the plurality of formation top depths is invalid due to the respective formation being eroded, wherein the respective formation top is determined to be invalid in response to the thickness of the respective formation being less than a predetermined erosion threshold.

15. The non-transitory computer readable medium of claim 14, wherein the instructions further comprise functionality for:
   determining a well path through the geological region of interest using the plurality of formation top depths.

16. The non-transitory computer readable medium of claim 14,
   wherein the machine-learning model is a deep neural network comprising a plurality of dilation layers,
   wherein a respective dilation layer among the plurality of dilation layers is a convolutional layer that uses a predetermined dilation factor.

17. The non-transitory computer readable medium of claim 14, wherein the instructions further comprise functionality for:
   generating a first input sequence using the seismic data; and
   generating a second input sequence using the well log data,
   wherein the machine-learning model determines a predicted formation top depth using the first input sequence and the second input sequence.

\* \* \* \* \*